Patented Feb. 20, 1945

2,369,985

UNITED STATES PATENT OFFICE 2,369,985

VINYL RESIN COMPOSITIONS

Moyer M. Safford, Schenectady, N. Y., assignor to General Electric Company, a corporation of New York No Drawing. Application April 26, 1941, Serial No. 390,587

6 Claims. (Cl. 260—36)

The present invention relates generally to vinyl resin compositions.

As disclosed and claimed in my copending application Serial No. 339,526, filed June 8, 1940, now Patent No. 2,269,990, dated January 13, 1942, and assigned to the same assignee as the present invention, methyl chlor stearates having at least three chlorine atoms in the molecule are excellent plasticizers for polyvinyl halides. These compounds are relatively cheap, give a plasticized product of tensile strength comparable to those polyvinyl halides plasticized with tricresyl phosphate, impart good low temperature flexibility, and are otherwise generally advantageous additions to polyvinyl halides.

It has been found that in addition to the polyvinyl halides, the products of the conjoint polymerization of vinyl halides with vinyl esters of the lower aliphatic acids, for example the products of copolymerization of vinyl chloride and vinyl acetate may be plasticized with the methyl chlor stearates. Also, the products may be electrically stabilized with the various compounds used to stabilize the polyvinyl halide compositions.

This is illustrated, for example, by the following data obtained from compositions prepared by using a copolymeric vinyl resin known as "Vinylite VYNW" which is a product of the conjoint polymerization of vinyl chloride and vinyl acetate. Four compositions were prepared using the following plasticizers:

1. Tricresyl phosphate
2. Methyl trichlorstearate
3. Methyl pentachlorstearate
4. Methyl hexachlorstearate Because this copolymer does not require as much plasticizer to give the same hardness as plasticized polyvinyl chloride, 35% instead of the usual 40% of plasticizer was employed.

Each of the plasticized compositions was electrically stabilized with the following materials:

1. Lead oxide
2. Lead hydroxide
3. Lead salt of para tertiary amyl phenol

It will be noted from the following table on initial readings, in every case where the methyl chlor stearates are used, that the methyl hexachlorstearate shows the lowest electrical losses. It will be further noted that in general the methyl chlor stearates have lower electrical losses than the comparable tricresyl phosphate compositions.

| Resin | Plasticizer | Stabilizer | Loss factor ($\epsilon''$) [1] |
|---|---|---|---|
| Vinylite VYNW. | Tricresyl phosphate. | | 96.2 |
| Do | do | 2% lead salt para tertiary amyl phenol. | 1.088 |
| Do | do | 6% lead hydroxide | 30.0 |
| Do | do | 5% litharge | 1.23 |
| Do | Methyl trichlor stearate. | | 91.8 |
| Do | do | 2% lead salt para tertiary amyl phenol. | 3.88 |
| Do | do | 6% lead hydroxide | 7.2 |
| Do | do | 5% litharge | 2.35 |
| Do | Methyl pentachlor stearate. | | 40.4 |
| Do | do | 2% lead salt para tertiary amyl phenol. | 1.64 |
| Do | do | 6% lead hydroxide | 1.98 |
| Do | do | 5% litharge | 0.773 |
| Do | Methyl hexachlor stearate. | | 11.32 |
| Do | do | 2% lead salt para tertiary amyl phenol. | 1.092 |
| Do | do | 6% lead hydroxide | 0.91 |
| Do | do | 5% litharge | 0.50 |

[1] 60 cycles, 90° C. loss factor calculated from D.-C. resistivity ($\rho$) by means of the equation $$\epsilon'' = \frac{3 \times 10^{10}}{\rho}$$

Broadly stated, my invention embraces the plasticization with the methyl chlor stearates of the products of polymerization of any polymerizable composition containing essentially vinyl halide. Thus, in addition to the foregoing, vinyl resin compositions which are the product of the conjoint polymerization of vinyl halides and esters of acrylic and methacrylic acids may be employed. Also, vinyl resin compositions disclosed and claimed in the copending application Serial No. 367,116, of Gaetano F. D'Alelio, filed November 25, 1940, now Patent No. 2,299,740, dated October 27, 1942, and assigned to the same assignee as the present invention, may be used. Such compositions are briefly compositions comprising the polymerization product of a polymerizable mixture comprising essentially vinyl halide and an arylalkanol or halo-arylalkanol ester of acrylic acid, e. g., benzyl acrylate or a chlor benzyl acrylate.

What I claim as new and desire to secure by Letters Patent of the United States is:

1. A composition comprising (1) the product of the conjoint polymerization of vinyl halides and vinyl esters of the lower aliphatic acids and (2) a methyl chlor stearate having at least 3 chlorine atoms in the molecule.

2. A composition comprising the product of the conjoint polymerization of vinyl chloride and vinyl acetate, and a methyl chlor stearate having 3 to 6 chlorine atoms in the molecule.

3. A composition comprising (1) the product of polymerization of a polymerizable mixture comprising essentially vinyl halide and an ester of an acrylic acid and (2) a methyl chlor stearate having at least 3 chlorine atoms in the molecule.

4. A composition comprising (1) the product of polymerization of a polymerizable mixture comprising essentially vinyl chloride and a benzyl acrylate and (2) a methyl chlor stearate having 3 to 6 chlorine atoms in the molecule.

5. A composition comprising methyl hexachlor stearate and the product of the conjoint polymerization of vinyl chloride and vinyl acetate.

6. A composition comprising, a methyl chlor stearate having at least three chlorine atoms in the molecule, and a vinyl resin which is the product of the conjoint polymerization of a vinyl halide with an ester of the group consisting of vinyl esters of the lower aliphatic acids, esters of acrylic acid and esters of methacrylic acid.

MOYER M. SAFFORD.